(12) United States Patent
Gunton

(10) Patent No.: US 7,333,308 B2
(45) Date of Patent: Feb. 19, 2008

(54) CONTROL ARRANGEMENT

(76) Inventor: Bruce Stanley Gunton, 3 Gisborne Close, Yoxall, Staffordshire DE13 8NU (GB)

( * ) Notice: Subject to any disclaimer, the term of this patent is extended or adjusted under 35 U.S.C. 154(b) by 215 days.

(21) Appl. No.: 10/472,357

(22) PCT Filed: Mar. 22, 2002

(86) PCT No.: PCT/GB02/01390

§ 371 (c)(1),
(2), (4) Date: Sep. 17, 2003

(87) PCT Pub. No.: WO02/078030

PCT Pub. Date: Oct. 3, 2002

(65) Prior Publication Data
US 2004/0085110 A1 May 6, 2004

(30) Foreign Application Priority Data
Mar. 23, 2001 (GB) .................................. 0107354.3

(51) Int. Cl.
H02H 3/00 (2006.01)
H02H 5/00 (2006.01)
H01H 47/00 (2006.01)

(52) U.S. Cl. ............................. 361/5; 361/72; 361/160
(58) Field of Classification Search .................. 361/72, 361/5, 160
See application file for complete search history.

(56) References Cited

U.S. PATENT DOCUMENTS

| 3,646,454 | A | * | 2/1972 | Southern | ..................... 327/339 |
|---|---|---|---|---|---|
| 4,241,372 | A | | 12/1980 | Sears | |
| 5,182,456 | A | | 1/1993 | Beezley | |
| 5,375,027 | A | * | 12/1994 | Bledsoe et al. | ................ 361/87 |
| 5,400,206 | A | * | 3/1995 | Barnes et al. | .................. 361/72 |
| 5,977,732 | A | * | 11/1999 | Matsumoto | .................. 318/283 |
| 6,016,965 | A | * | 1/2000 | Yoshimura et al. | ........... 236/35 |

FOREIGN PATENT DOCUMENTS

| BE | 669688 | 12/1965 |
|---|---|---|
| DE | 41 08 049 | 9/1992 |
| DE | 42 30 544 | 3/1994 |
| DE | 43 15 468 | 6/1994 |
| EP | 0 800 979 | 10/1997 |
| GB | 1117007 | 6/1968 |

* cited by examiner

Primary Examiner—Michael Sherry
Assistant Examiner—Scott Bauer
(74) Attorney, Agent, or Firm—Smith-Hill and Bedell

(57) ABSTRACT

A control arrangement is operable to control an electrical relay to supply current. The arrangement comprises current supply means and control means operable to provide a relay make signal and a relay break signal to control the state of the relay to respectively make and break a connection to the current supply means. Further control means are operable to enable or disable the current supply means. A first delay means operates to delay enabling the current supply means until after a relay make signal has been provided, to allow the relay to make the connection before current supply commences. Excess current is also sensed and controlled by a form of pulse-width modulation.

24 Claims, 2 Drawing Sheets

CONTROL ARRANGEMENT

Figure 1:
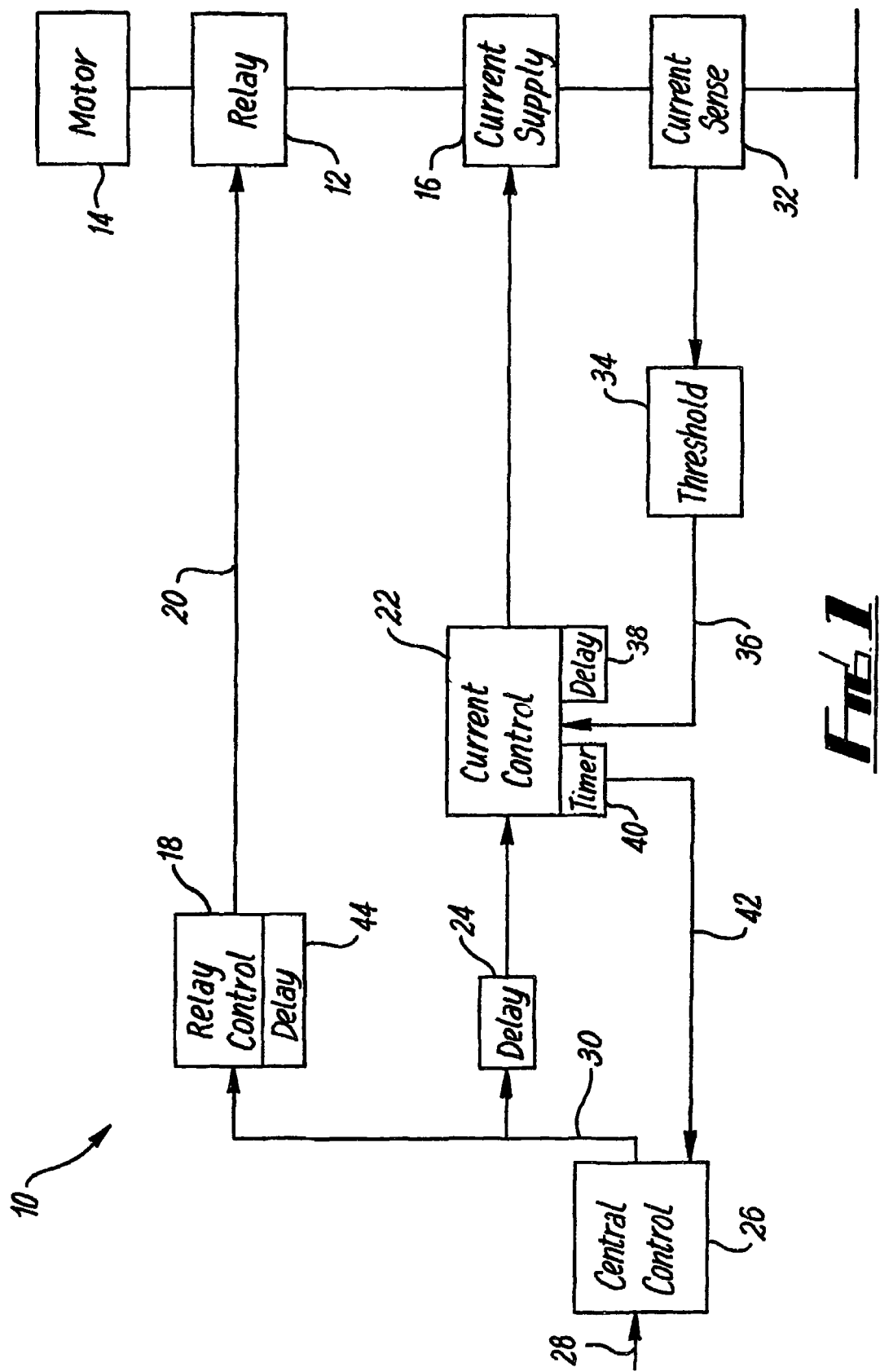

This is a national stage application filed under 35 USC 371 based on International Application No. PCT/GB2002/001390 filed Mar. 22, 2002, and claims priority under 35 USC 119 of United Kingdom Patent Application No. 0107354.3 filed Mar. 23, 2001.

The present invention relates to control arrangements operable to control an electrical relay to supply current, for example current to an electric motor.

Many applications use relays to control current to apparatus such as electric motors. For example, sliding doors may be moved by electric motors connected to a current supply by relays.

The present invention seeks to provide an improved arrangement for controlling an electrical relay to supply current.

The present invention provides a control arrangement operable to control an electrical relay to supply current, the arrangement comprising current supply means and control means operable to provide a relay make signal and a relay break signal to control the state of the relay to respectively make and break a connection to the current supply means, wherein the control means is further operable to enable or disable the current supply means, the arrangement including first delay means operable to delay enabling the current supply means until after a relay make signal has been provided, to allow the relay to make the connection before current supply commences.

Preferably second delay means are provided, operable to delay a relay break signal until after the current supply means has been disabled, in the event that current supply to the electrical relay is to cease.

The control means may comprise relay control means operable to provide relay make and break signals, current control means operable to control the current supply means, central control means operable to provide a common signal to the relay control means and to the current control means to indicate if the electrical relay is required to supply current or not, the first delay means being operable to delay receipt by the current control means of a common signal from the central control means.

The first delay means may comprise an input for receiving common signals, a time constant circuit, and a switching circuit connected to the input through the time constant circuit and providing an output to control the current control means, whereby the output is delayed relative to the common signal at the input, by operation of the time constant circuit.

The current supply means may comprise a switching member which enables or disables the current supply. The switching member is preferably a semiconductor, such as a power transistor, preferably a MOSFET transistor.

The current supply means may comprise a bias arrangement tending to hold a control terminal of the switching member at a first state, and an override arrangement operable to override the bias arrangement to hold the control terminal at a second state or to release the bias arrangement to hold the control terminal at the first state, the bias arrangement being controlled by a said common signal. The bias arrangement may comprise a bipolar transistor which connects the control terminal to a power rail when the transistor is on or off, and has a base connected to a voltage level which holds the transistor on or off, respectively, unless overridden, the override arrangement being operable to connect the base to an alternative voltage level which holds the transistor off or on, respectively.

The relay control means may comprise a transistor switch circuit controlled by common signals from the central control means to switch the state of the relay. The transistor switch circuit may switch coil current to the relay. The second delay means is preferably operable to maintain the coil current for a delay period after the state of the common signal changes.

A control arrangement according to the first aspect of the invention may further incorporate features according to the second aspect of the invention, as set out below.

In a second aspect, the invention provides a control arrangement operable to control an electrical relay to supply current, the arrangement comprising current supply means operable to supply current through the relay, current sensing means operable to measure the current being supplied, and control means operable in the event that the current supply is excessive, to cause the current supply to be pulsed to reduce the power being supplied.

Preferably the current sensing means comprises a series resistor carrying current to the relay, and sensing means operable to sense the voltage across the resistor. The sensing means may comprise a voltage divider circuit. The midpoint of the voltage divider circuit is preferably used to control a transistor switch circuit. The output of the sensing means may be applied through delay means to disable the current supply means in the event that excessive current is sensed, whereby the current supply means will be re-enabled after a period set by the delay means.

Preferably the control means is operable to prevent the current supply means being re-enabled in the event that excessive current is sensed repeatedly over a period in excess of a predetermined length of time.

Figure 2:
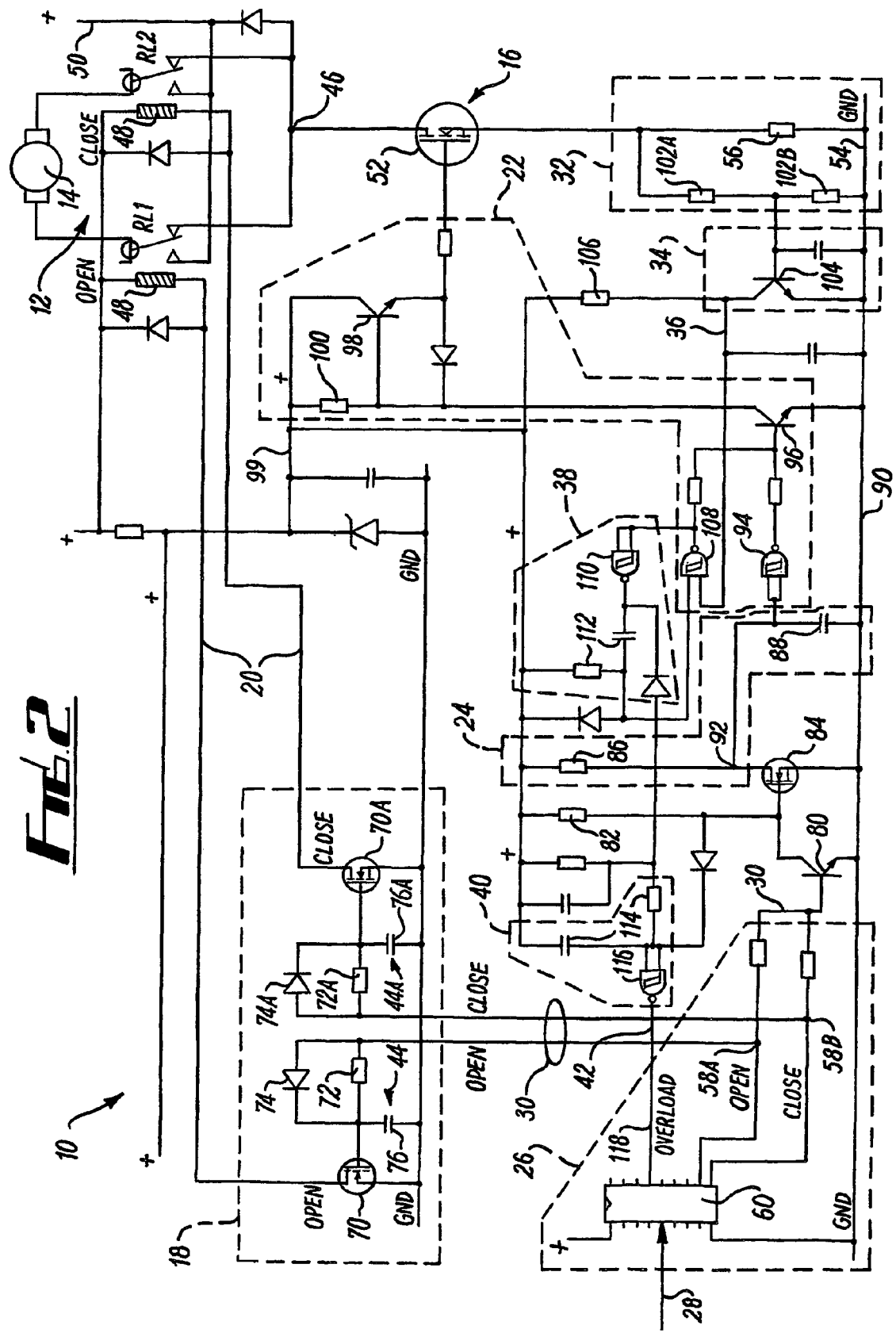

An example of the present invention will now be described in more detail, by way of example only, and with reference to the accompanying drawings, in which:

FIG. 1 is a block schematic diagram of apparatus according to the present invention; and FIG. 2 illustrates the arrangement of FIG. 1 in greater detail.

FIG. 1 shows a control arrangement 10 operable to control an electrical relay 12 to supply current, for instance drive current to a motor 14. The arrangement 10 has a current supply 16 for supplying current to the relay 12 for connection to the motor 14. A control arrangement at 18 provides a relay make signal and a relay break signal at 20 to control the state of the relay 12 to respectively make and break a connection between the current supply 16 and the motor 14. Current control arrangements indicated generally at 22 operate to enable or disable the current supply 16. A first delay circuit 24 operates to delay the current supply 16 being enabled until after the relay control circuit 18 has provided a relay make signal to the relay 12, so that the relay 12 is able to connect the current supply 16 to the motor 14 before the current supply 16 commences to supply current.

The inventor has appreciated that the introduction of this delay reduces or eliminates the problem of arcing at the terminals of the relay 12, thus increasing the expected life of the relay.

By way of example only, and in order to better illustrate the operation and benefits of the apparatus being described, reference will be made to the arrangement 10 being used to control a motor 14 which drives a sliding door. However, the skilled reader will appreciate that similar principles can be used in other applications.

In more detail, the arrangement 10 has a central control circuit 26 which receives instructions at 28, for instance from operator controls instructing the arrangement 10 to open or close the door operated by the motor 14. When door operation is required, the circuit 26 instructs the relay control circuit 18 to close the relay 12, thus connecting the motor 14 to the current supply 16. At this stage, the current supply 16 has not yet commenced supplying current. Thus, arcing at the contacts of the relay 12 is prevented.

In the example being described, the motor 14 is required to open or close a door, as appropriate. This is achieved by the relay 12 being able to supply motor current in either sense, as will be described more fully in relation to FIG. 2.

The signal from the central control 26 to the relay control 18, at 30 is also provided to the delay circuit 24. Thus, the signal 30 is common to the relay control 18 and the delay circuit 24. After appropriate delay, the delay circuit 24 passes the common signal 30 to the current control circuit 22 which then causes the current supply 16 to commence supplying current to the motor 14 through the relay 12. The delay introduced by the delay circuit 24 is set to allow the relay 12 sufficient time to close the relay contacts before the current supply 16 commences, thus preventing arcing at the relay contact, as noted above.

The arrangement 10 also includes a current sensing arrangement at 32, which senses the magnitude of current being supplied to the motor 14. A threshold detector arrangement 34 detects if the current sensed at 32 has exceeded a predetermined threshold. If so, the current control 22 is instructed at 36 to disable the current supply 16. A delay circuit 38, associated with the current control 22, then introduces a delay before the current control 22 is again able to turn on the current supply 16. In the event that the cause of the excessive current has now passed away, continuous current supply will then resume. However, in the event that the cause remains, the current will again be sensed as excessive, and current supply will again be disabled. Thus, the arrangement of the current sensor 32, the threshold detector 34, the current control 22 and the delay 38 serve to cause the current supply 16 to provide a form of pulse width modulated (PWM) current supply which limits the power delivered to the motor 14, thus protecting the motor 14 in the event that abnormal operation has given rise to excessive current demands.

Examples of abnormalities which may give rise to excessive current demands include a fault within the motor, or an inappropriate form of operation, such as an instruction to open the door while a mechanical security bolt is still engaged.

A timer circuit 40 monitors this PWM operation. If PWM operation continues for a period in excess of a predetermined time, the timer 40 signals this at 42 to the central control 26. In response, the central control 26 issues a common signal 30 which disables current supply and breaks the relay. Further delay 44 built into the relay control 18 causes the opening of the relay 12 to be delayed beyond the discontinuing of current supply, again to prevent arcing at the relay terminals.

The arrangement described above in relation to FIG. 1 is illustrated in more detail in FIG. 2.

It is first appropriate to describe the relay arrangement 12. This has two sets of contacts RL1, RL2 having their common contacts connected to respective sides of the motor 14, which is a DC motor in this example, and their switch contacts connected so that when the coils 48 of the relay 12 are de-energised, the two sides of the motor 14 are connected together at 46, thus locking the motor 14. Each set of contacts RL1, RL2 has an associated coil 48. When the motor 14 is to run, one or other coil 48 is energised, as will be described, to connect the corresponding side of the motor to a positive supply at 50. Either side of the motor 14 can be connected to one side of the power supply at 50, by energising the appropriate coil 48. The other side of the motor remains connected through the other set of contacts RL1, RL2 to the common point 46, which is in turn connected to the current supply 16, in the form of the channel of a MOSFET transistor 52 connected to the other side of the power supply at 54 through a series resistor 56.

Consequently, DC current provided between the supply rails 50, 54 can flow in either direction through the motor 14, according to the choice of coil 48 which is energised, thus allowing the motor 14 to be operated in either direction, but subject to the control imposed by the transistor 52, which supplies current to the motor only when turned on. Control arrangements for the transistor 52 will be described below.

The control of the coils 48 occurs within the circuit 18, in response to OPEN or CLOSE signals provided at 58 by a microcontroller 60 within the central control 26. The voltage level of signals at 58A, 58B is low except when motor operation is required. When the OPEN signal 58A is low, transistor 70 is held off through resistor 72, thus preventing current through the coil 48 controlling terminals RL1. This leaves RL1 in the position shown in FIG. 2.

When the motor 14 is required to open the door, the signal at 58A goes high. The diode 74, which shunts resistor 72, is then forward-biased to turn on transistor 70 and thus conduct energising current through the coil 48 for terminals RL1. Terminals RL1 thus switch, connecting the motor 14 in the appropriate sense for opening the door (but subject to the control of the transistor 52 as noted above).

It is important to note that there is substantially no time delay in switching the relay terminals RL1 in response to signal 58A going high.

When door opening is no longer required, the microcontroller 60 returns signal 58A to the low state. The gate of the transistor 70 does not immediately change state, being held high by capacitor 76 until the capacitor 76 has discharged through resistor 72, with a time constant set by the values of the resistor 72 and capacitor 76. This time constant introduces a delay between the signal 54A going low, and the transistor 70 switching, so that the current to the coil 48 for terminals RL1 will not switch off until this delay has elapsed. The significance of this delay will be appreciated from the description set out below.

It can readily be appreciated from FIG. 2 that control of the coil for terminals RL2 is achieved by an equivalent circuit driven by the CLOSE signal 58B and for which same reference numerals are repeated, with the suffix A.

Control arrangements relating to the transistor 52 can now be described, as follows.

The OPEN and CLOSE signals 58A, 58B are both applied to the base of transistor 80, which is a bipolar transistor having a series collector resistor 82, the collector being directly connected to the gate of an FET transistor 84. When the motor 14 is not operating, both signals 58A, 58B are low, transistor 80 is off, the collector of transistor 80 will be high, and transistor 84 will thus be on.

The channel of the transistor 84 is in series with a resistor 86 and shunted by a capacitor 88, so that when the transistor 84 is on, the capacitor 88 will be discharged, effectively having both terminals at the potential of the ground rail 90.

When either the OPEN or CLOSE signal 58A, 58B goes high, transistor 80 will be switched on and its collector will go low, switching off transistor 84. Capacitor 88 is then able to charge through resistor 86 so that the voltage at the point common to the transistor 84, resistor 86 and capacitor 88 will rise at a rate determined by the time constant set by the values of the resistor 86 and capacitor 88. This thus introduces a delay in the voltage rise at the common point 92, as compared with the change at 58A, 58B.

The common point 92 is also the input to an inverter 94 whose output controls the switch state of a transistor 96. The state of the inverter 94 thus changes as the voltage at the common point 92 changes, but the change of state of the inverter 94 is delayed by the delay described in relation to the resistor 86 and capacitor 88. Switching of the transistor 96 is thus similarly delayed. With the signals 58A, 58B both low, the output of inverter 94 will be high and transistor 96 will be switched on. When either signal 58A, 58B goes high, the output of the inverter 94 will go low, after a delay, switching the transistor 96 off.

The switch state of the transistor 96 is used to override a circuit based around transistor 98 and which controls the gate of the current transistor 52. The collector of transistor 98 is connected to a positive supply rail 99 and the base is connected to the same positive supply rail, through resistor 100. The base of transistor 98 is also connected to the collector of transistor 96. Thus, when transistor 96 is off, transistor 98 will be held on, thus holding the gate of transistor 52 at the positive supply rail potential and holding the transistor 52 turned on.

However, this tendency of transistor 98 to bias transistor 52 to turn on is overridden in the event that transistor 96 is on, as will be the position if signals 58A, 58B are both low. In that event, the base of transistor 98 is held at ground rail potential through the transistor 96, which will be on. Transistor 98 is thus switched off and the gate of transistor 52 is similarly held at ground potential, switching off transistor 52. This will be the condition with signals 58A, 58B both low. As a result, transistor 52 is switched off and current supply to the relay 12 (and motor 14) is thus disabled.

However, in the event that either signal 58A or 58B goes high, the output of inverter 94 will go low, after the delay described above, thus switching off transistor 96. This ceases to override the bias provided by transistor 98, allowing transistor 52 to be turned on to begin supplying current to the relay 12. It is important to note that, as has been described above, turning on the transistor 52 is delayed in response to the change of state of the signals 58A or 58B, whereas switching of the relay terminals RL1, RL2 is not delayed. Thus, the appropriate terminal RL1, RL2 will have switched before the transistor 52 turns on to supply current. This prevents arching in the terminals RL1, RL2 as they switch.

When signals 58A, 58B again go low to switch off the motor 14, transistor 80 immediately switches off and transistor 84 immediately switches on. Capacitor 88 immediately discharges through transistor 84. The input to inverter 94 immediately goes low and the output of inventor 94 immediately goes high. Transistor 96 immediately switches on, the action of transistor 98 is immediately overridden and transistor 52 immediately switches off to disable current supply to the relay 12. However, as described above, current to the relay coils 48 is not cut off immediately, by virtue of the action of capacitors 76A, 76B. The terminals RL1, RL2 do not immediately switch. The time constants within the relay control circuit 18 are set to ensure that the transistor 52 will have shut off current to the relay 12 before the terminals RL1, RL2 switch, thus again protecting the relay against arcing.

Additional protection within the system is provided by other components, which can now be described.

Resistor 56 has been described in series with the channel of transistor 52. Resistor 56 is used for current sensing. Current through resistor 56 gives rise to a voltage across the resistor 56. This is sensed by a voltage divider 102 formed by two resistors 102A, 102B in series with each other and shunting resistor 56. The common terminal of the resistors 102A, 102B thus has a voltage level which rises or lowers in response to changes in current through the current sensing resistor 56. This voltage level is thus a measure of supply current to the motor 14. The common terminal of the resistors 102A, 102B is connected to the base of transistor 104 which acts as a threshold detector to switch on when the voltage from the voltage divider 102 rises above the switching voltage of the transistor 104. The collector of transistor 104 is connected to the positive supply 99 through series resistor 106 and also to an input of inverter 108. Consequently, when transistor 104 is turned on by excessive motor current, the input to inverter 108 goes low and the inverter output goes high. The inverter output is applied to the base of transistor 96 so that in the event of excessive current being sensed, inverter 108 forces transistor 96 to turn on, disabling current supply to the motor by switching off the transistor 52, as described above.

However, this state only remains for a period set by the delay circuit 38, as follows. A further inverter 110 receives the output of the inverter 108 and applies this to a resistor-capacitor time constant circuit 112. Thus, when the output of inverter 108 has gone high, causing the output of inverter 110 to go low, the RC circuit 112 retains the second input to inverter 108 low, until the RC circuit 112 has discharged. At this point, the inverter 108 is caused to switch low, switching off transistor 96 and allowing transistor 52 to turn on again, to recommence current supply to the motor 14. In the event that the problem causing the excessive motor current has now gone away, normal operation will resume. However, if the problem remains, excessive motor current will again be sensed as described above, the transistor 52 will again be switched off for a period set by the RC circuit 112, and the transistor 52 will thus enter a form of pulse width modulation operation which limits the power being provided.

While a short period of this pulse width modulation operation may be acceptable, an extended period would indicate a significant problem existing. Consequently, timer circuit 40 is used to monitor PWM operation and completely shut down the arrangement in the event that PWM operation continues for a period in excess of a predetermined time. This timing arises as follows. The output of the inverter 110 is applied to a further RC circuit 114, the common terminal of which forms the input of a further inverter 116, the output of which is provided to the microcontroller 60. During normal operation, the output of inverter 110 will normally be high and the capacitor of RC circuit 114 will be discharged, holding the input of inverter 116 high and providing a normally low signal at 118 to the microcontroller 60. However, each time the output of inverter 110 goes low (as a cycle of the PWM operation is executed), the capacitor of RC circuit 114 will receive additional charge, so that the input to inverter 116 will steadily reduce as PWM operation continues, until the inverter 116 changes state. This sends the overload signal 118 high, indicating to the microcontroller 60 that PWM operation has continued for a period in excess of the predetermined time (governed by the time constant of the circuit 114), and in response, the microcontroller 60 will take both signals 58A, 58B low, to disable the arrangement.

There is thus provided an arrangement in which arcing of the delay terminals is prevented by ensuring that motor current is not flowing at the time the relay switches. In addition, excessive motor current is sensed, and controlled by PWM modulation. In the event that excessive current continues, the system is disabled.

It will be apparent that many variations and modifications can be made to the apparatus described above, without departing from the scope of the present invention. In particular, many details of the circuits shown in FIG. 2 and described above can be modified according to the particular intended application. Some of the functions provided by hardware in the arrangement described above could alternatively be provided by software, for instance within the microcontroller 60. Thus, the microcontroller could provide the delay function of the circuit 24, issuing appropriately timed circuits to make or break the relay and to turn the current transistor 52 on or off. Control of the PWM operation, current sensing and the timing function of the circuit 40 could be implemented wholly or partly by software. Component values and component technology choices, including the choice of implementation in hardware or software, will be within the knowledge of the skilled reader, as will appropriate alternatives. These are encompassed within the scope of the present invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An arrangement comprising:
a DC motor,
current supply means,
an electrical relay through which current is supplied, in use, from the current supply means to the motor, and
control means operable to provide a relay make signal and a relay break signal to control the state of the relay to respectively make and break a connection to the current supply means, wherein the control means is further operable to enable or disable the current supply means and includes first delay means operable to delay enabling the current supply means until after a relay make signal has been provided, to allow the relay to make the connection before current supply commences, and second delay means operable to delay a relay break signal until after the current supply means has been disabled, in the event that current supply to the electrical relay is to cease,
and wherein the arrangement further comprises current sensing means operable to measure the current being supplied by the current supply means and the control means is operable to test whether the magnitude of the current exceeds a predetermined limit and, if so, disable the current supply means for a predetermined time and, at the end of said predetermined time, test whether the magnitude of the current exceeds said predetermined limit.

2. An arrangement according to claim 1, wherein the control means comprises relay control means operable to provide relay make and break signals, current control means operable to control the current supply means, central control means operable to provide a common signal to the relay control means and to the current control means to indicate if the electrical relay is required to supply current or not, the first delay means being operable to delay receipt by the current control means of a common signal from the central control means.

3. An arrangement according to claim 2, wherein the first delay means comprises an input for receiving common signals, a time constant circuit, and a switching circuit connected to the input through the time constant circuit and providing an output to control the current control means, whereby the output is delayed relative to the common signal at the input, by operation of the time constant circuit.

4. An arrangement according to claim 1, wherein the current supply means comprises a switching member which enables or disables the current supply.

5. An arrangement according to claim 4, wherein the switching member is a semiconductor.

6. An arrangement according to claim 2, wherein the current supply means comprises a switching member which enables or disables the current supply, and wherein the current supply means comprises a bias arrangement tending to hold a control terminal of the switching member at a first state, and an override arrangement operable to override the bias arrangement to hold the control terminal at a second state or to release the bias arrangement to hold the control terminal at the first state, the bias arrangement being controlled by a said common signal.

7. An arrangement according to claim 6, wherein the bias arrangement comprises a bipolar transistor which connects the control terminal to a power rail when the transistor is on or off, and has a base connected to a voltage level which holds the transistor on or off, respectively, unless overridden, the override arrangement being operable to connect the base to an alternative voltage level which holds the transistor off or on, respectively.

8. An arrangement according to claim 2, wherein the relay control means comprises a transistor switch circuit controlled by common signals from the central control means to switch the state of the relay.

9. An arrangement according to claim 8, wherein the transistor switch circuit switches coil current to the relay.

10. An arrangement according to claim 9, wherein the second delay means is operable to maintain the coil current for a delay period after the state of the common signal changes.

11. An arrangement according to claim 1, wherein the current sensing means comprises a series resistor carrying current to the relay, and sensing means operable to sense the voltage across the resistor.

12. An arrangement according to claim 11, wherein the output of The sensing means is applied to disable the current supply means in the event that excessive current is sensed and is applied through delay means to re-enable the current supply means after a period set by the delay means.

13. An arrangement according to claim 1, comprising timer means operable to detect the event that excessive current is sensed repeatedly over a period in excess of a predetermined length of time, and wherein the timer means is operable to signal the occurrence of said event to the control means and the control means is operable to respond to the said event by preventing the current supply means being re-enabled.

14. An arrangement according to claim 13, wherein the control means comprises relay control means operable to provide relay make and break signals, current control means operable to control the current supply means, central control means operable to provide a common signal to the relay control means and to the current control means to indicate if the electrical relay is required to supply current or not, the first delay means being operable to delay receipt by the current control means of a common signal from the central control means.

15. An arrangement according to claim 14, wherein the first delay means comprises an input for receiving common signals, a time constant circuit, and a switching circuit connected to the input through the time constant circuit and providing an output to control the current control means, whereby the output is delayed relative to the common signal at the input, by operation of the time constant circuit.

16. An arrangement according to claim 13, wherein the current supply means comprises a switching member which enables or disables the current supply.

17. An arrangement according to claim 16, wherein the switching member is a semiconductor.

18. An arrangement according to claim 13, wherein the current supply means comprises a switching member which enables or disables the current supply, and wherein the current supply means comprises a bias arrangement tending to hold a control terminal of the switching member at a first state, and an override arrangement operable to override the bias arrangement to hold the control terminal at a second state or to release the bias arrangement to hold the control terminal at the first state, the bias arrangement being controlled by a said common signal.

19. An arrangement according to claim 18, wherein the bias arrangement comprises a bipolar transistor which connects the control terminal to a power rail when the transistor is on or off, and has a base connected to a voltage level which holds the transistor on or off, respectively, unless overridden, the override arrangement being operable to connect the base to an alternative voltage level which holds the transistor off or on, respectively.

20. An arrangement according to claim 13, wherein the relay control means comprises a transistor switch circuit controlled by common signals from the central control means to switch the state of the relay.

21. An arrangement according to claim 20, wherein the transistor switch circuit switches coil current to the relay.

22. An arrangement according to claim 21, wherein the second delay means is operable to maintain the coil current for a delay period after the state of the common signal changes.

23. An arrangement according to claim 13, wherein the current sensing means comprises a series resistor carrying current to the relay, and sensing means operable to sense the voltage across the resistor.

24. An arrangement according to claim 23, wherein the output of the sensing means is applied to disable the current supply means in the event that excessive current is sensed and is applied through delay means to re-enable the current supply means after a period set by the delay means.

* * * * *